United States Patent [19]

Fuchs

[11] 4,037,883

[45] July 26, 1977

[54] ANTI-LOCKING BRAKE SYSTEM

[76] Inventor: Werner Karl Heinz Fuchs, Sedlmayrstr. 14, 8 Munich 19, Germany

[21] Appl. No.: 614,198

[22] Filed: Sept. 17, 1975

Related U.S. Application Data

[63] Continuation-in-part of Ser. No. 405,412, Oct. 11, 1973, abandoned, which is a continuation of Ser. No. 185,130, Sept. 30, 1971, abandoned.

[30] Foreign Application Priority Data

Oct. 5, 1970 Germany ............................ 2048802

[51] Int. Cl.² .............................................. B60T 8/06
[52] U.S. Cl. ..................................... 303/116; 303/61
[58] Field of Search ................. 188/181 A; 303/24 F, 303/61, 116

[56] References Cited

U.S. PATENT DOCUMENTS

| | | | |
|---|---|---|---|
| 3,276,822 | 10/1966 | Lister et al. | 303/24 F |
| 3,379,288 | 4/1968 | Dave | 188/181 A |
| 3,524,684 | 8/1970 | Skoyles | 303/61 X |
| 3,617,098 | 11/1971 | Leaber | 303/61 X |
| 3,682,514 | 8/1972 | Oberthur | 303/61 X |
| 3,731,979 | 5/1973 | Mikaila | 303/61 X |

Primary Examiner—Duane A. Reger

[57] ABSTRACT

The invention relates to an anti-skid brake system for vehicles. The system shows a new-type sensor and a new brake pressure control device which is activated by the sensor when and for as long as is required. If necessary, the pressure control device produces brake pressure pulsations so that the vehicle's wheels will be intermittently braked. The amplitudes of these pulsations control a special pressure regulating valve depending upon the braking force being applied.

The shown sensor controls and compares by electrical means the wheel angular deceleration with the vehicle linear deceleration and provides data signals when the decelerations deviate inadmissibly from one another.

10 Claims, 4 Drawing Figures

ANTI-LOCKING BRAKE SYSTEM

CROSS REFERENCES TO RELATES APPLICATIONS

This invention is a continuation-in-part of U.S. patent application Ser. No. 405,412, filed Oct. 11, 1973, now abandoned, which is a continuation of U.S. patent application Ser. No. 185,130 filed Sept. 30, 1971, now abandoned.

Very advantageous sensors for anti-locking systems are shown in the copending U.S. patent application Ser. No. 670,350, filed June 27, 1975.

BACKGROUND OF THE INVENTION

This invention relates to anti-skid brake systems which prevent brake-locking and thus reduce the danger of skidding, maintain maneuverability, and shorten the braking distance.

In the vehicle braking art it is known to prevent skidding of the vehicle, and locking of the brakes, by using a pulsating braking force or pressure, and drivers often "pump" the brake pedal to improve the control of the vehicle during braking.

Braking systems for vehicles are known wherein intermittent braking pulses are produced to control skidding or brake locking, and reference is made to U.S. Pat. Nos. 2,959,012 and 3,089,734. However, known vehicle braking devices producing pulsations do not vary the amplitude or force of the pulsations dependent upon the braking force required, and known devices do not produce the type of close control of vehicle braking necessary to produce the safest and most efficient vehicle braking.

SUMMARY OF THE INVENTION

It is an object of the invention to provide an anti-locking brake system for vehicles wherein the need for pulsations within the vehicle braking system is automatically sensed, and pulsations are automatically produced which are of an amplitude proportional to the braking forces applied by the operator. Thus, the pulsations have an amplitude related to the existing road conditions, as determined by the brake pressure applied by the operator, and improved driver safety is achieved, and a system is constructed which overcomes disadvantages of known vehicle brake pulsation systems.

In accord with the invention an electric measuring sensor which is responsive to deceleration of the wheel rotation as well as to linear deceleration of the vehicle energizes a pulsation apparatus producing a pulsating force within the vehicle brake system having an amplitude dependent on the braking force being applied, and the pulsations continue as long as the sensor indicates the need for the same.

The sensor limits the need for brake pulsations only to the duration during which such pulsations are necessary to produce optimum braking, and the energy requirements for the pulsation device are small, utilizing an electric motor powered from the vehicle electrical system. The apparatus of the invention permits the operator to "feel" the extent of braking being produced, and thus the apparatus does not interfere with the reaction of the driver, and permits a high sensitivity to the braking action taking place.

In the practice of the invention a hydraulic master cylinder arrangement is employed. However, pulsation apparatus is utilized capable of imposing a force on the master brake piston rod and piston opposite to that being applied by the actuator, i.e., the operator. This opposing force pulsates, and the amplitude or force of the pulsations are determined by a relief valve which is controlled by the pressure within the hydraulic braking system or in the wheel brake cylinders. The greater the pressure within the hydraulic braking system, the greater the pulsation force imposed upon the master piston rod and the opposite piston. As the force within the hydraulic braking system is determined by the actuator, i.e., the driver, this hydraulic force is proportional to the braking requirements at any given time. Thus, the pulsations will have an amplitude, or force, dependent upon the braking requirements, and thus the intensity of the pulsations is a function of the applied brake force.

The source of pressurized fluid may be a master cylinder The term "master cylinder" is used herein to cover not only the normal case in which the driver actuates directly the piston in the master cylinder, but also cases where a pneumatic servomechanism or amplifier is interposed between the driver and said piston.

The relationship between the pressure within the vehicle hydraulic braking system and the amplitude of the pulsation forces are regulated by a pressure relief valve which is spring biased to a closed condition and the valve unseats upon the pulsation pressure overcoming the spring. The biasing force of the spring is increased or decreased by the pressure within the vehicle braking system.

A general object of the invention is to provide a new and useful anti-skid brake system of simple construction. The system adapts automatically to the existing road conditions and braking requirements, in that it produces brake pressure pulsations by means of a novel, especially advantageous sensor, but only when they are actually required, and in that it appropriately regulates the amplitudes of the pulsations into a pulsator device in order to achieve greater safety when braking.

An object of the invention is to provide a novel and useful sensor which is especially suitable for anti-skid systems and which improves the effectiveness of such systems. This sensor compares by electrical means the wheel periphery deceleration with the vehicle linear deceleration and provides data signals when the decelerations deviate inadmissibly from one another. Further advantages of the sensor are its principle of electric scanning, the sensitivity of response, the accuracy, its simple construction, the reliability, and especially, that it can be built with a higher natural frequency and makes possible a greater rate of control. In addition, this sensor can be constructed smaller, lighter, and produced economically, Another object of the invention is to provide advantageous pulsating means which are equipped with pressure regulating valves and serve to produce controlled brake pressure pulsations.

A further object of the invention is a pressure regulating valve which serves to control the amplitudes of the brake pressure pulsations and thus achieves greater safety when braking.

Other objects, features, and advantages of the present invention become apparent from the subsequent description, from the disclosure teaching of the principles of the invention, and from the appended claims taken in connection with the accompanying drawings.

BRIEF DESCRIPTION OF THE DRAWINGS

The aforementioned objects and advantages will be appreciated from the following description and accompanying drawings wherein.

DESCRIPTION OF THE PREFERRED EMBODIMENTS

Figure 1:
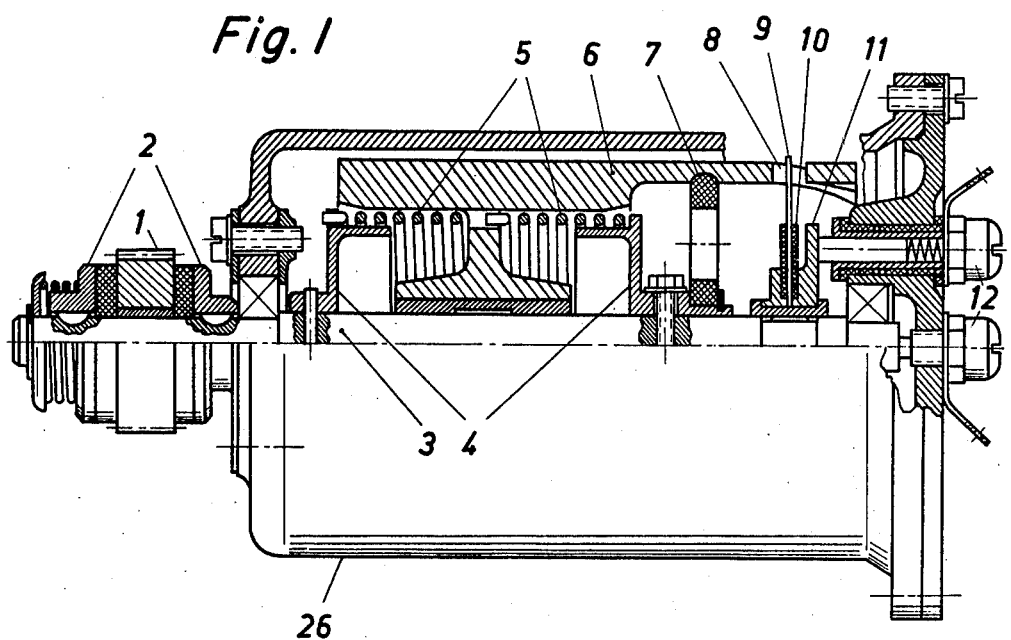
FIG. 1 is a partial diametrical, sectional view of the measurement sensor in accord with the invention.

In FIG. 1 a measurement sensor 26 is disclosed, which electrically compares the rotary wheel deceleration with the vehicle deceleration, and thereby determines the need for a pulsating braking action. The sensor 26 is mounted in the vehicle so that its axis runs parallel to the longitudinal axis of the vehicle. The sensor includes a housing in which a shaft 3 is rotatably mounted upon bearings. The shaft 3 is rotatably driven by a gear 1 mounted upon the shaft by an overload clutch 2. The gear 1 is driven by a breakable vehicle rear wheel, or from the vehicle drive shaft, not shown, wherein the shaft 3 will be rotated in dependence to the rotation of a vehicle rear wheel, or the drive shaft. Thus, the mounting orientation of the sensor, and its drive, permits the sensor mass to be axially displaceable in response to vehicle linear deceleration and — independently of that — rotatably displaceable in response to deceleration of wheel rotation.

Figure 1A:
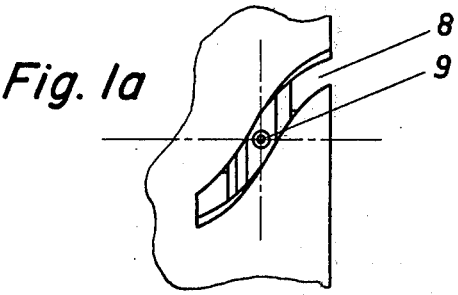
FIG. 1a is a plan view of the sensor recess and contact.

A mass 6, of cylindrical configuration, is resiliently mounted about the shaft 3 by coil springs 5 which are pretensioned for rotation and pressure to produce a predetermined resilient mounting of the mass 6 upon the shaft 3. In this manner the mass 6 can be axially and rotatively displaced relative to the shaft 3. Damping means 7 are interposed between the shaft 3 and the mass 6, and the mass includes a recess 8, FIGS. 1 and 1a, into which an electric contact 9 extends. The recess 8 extends both circumferentially and axially on the mass as to provide sensing of the mass movement both axially and rotatably. The recess 8 runs in the same direction in which the mass 6 moves relative to the electric contact 9, when the ratio of wheel periphery deceleration to vehicle linear deceleration is constant. The contact 9 is fixed upon the shaft 3 for rotation therewith, and is damped by a sleeve 10. Electrical contact is made with the contact 9 through a slip ring 11 engaged by electrical conducting brushes 12. The housing of the sensor 26 is grounded to the vehicle, and in the normal state of operation the contact 9 will be disposed intermediate to the sides of the recess 8, out of electrical contact with the mass 6, as illustrated in FIG. 1a.

With this sensor principle, contact between the mass 6 and said electric contact 9 is not necessary. A mechanical contact between the electric contact 9 and the flanks of the curved track 8 would be unnecessary, for example, if more electric voltage were used so that electric sparks could flash over if there was a change in the spacing between the contact 9 and the mass 6. The air in the recess 8 serves, for example, as an insulating material for the electric contact 9.

Figure 2:
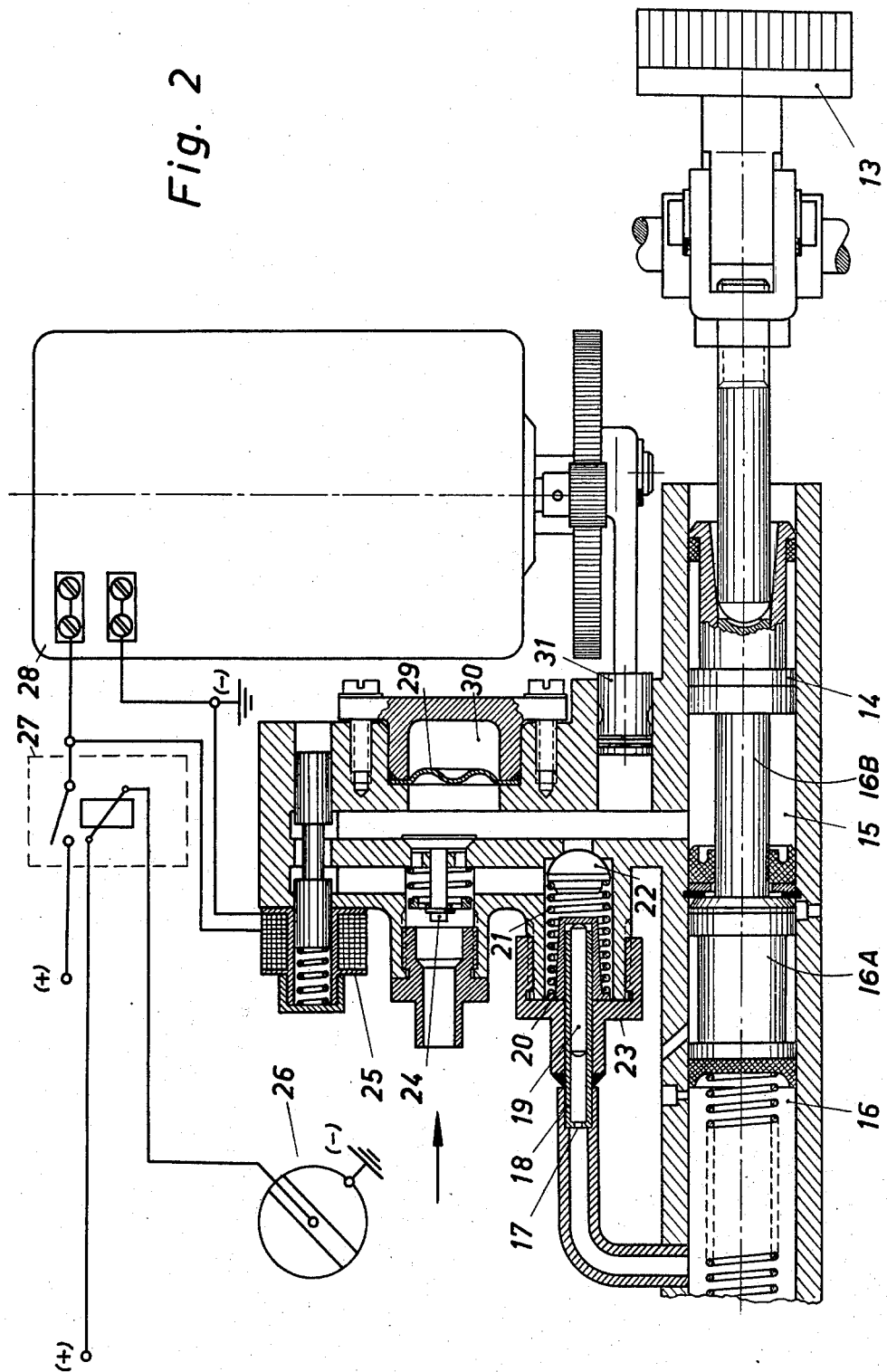
FIG. 2 is a combination sectional and schematic view of an embodiment of anti-locking brake device employing an electric motor and pump for producing pulsations.

The construction of the anti-locking brake device will be appreciated from FIG. 2. The device includes a housing, which may be designated a master cylinder housing, in which a cylindrical bore is defined which includes a master cylinder piston 16A reciprocal therein. The piston 16A is mounted upon a master cylinder piston rod 16B, and the piston and piston rod are reciprocated by a brake pedal 13 actuated by the vehicle driver in the usual manner. A conventional master cylinder 16 is defined within the master cylinder housing adjacent the piston 16A and displacement of the piston to the left increases the fluid pressure within cylinder 16 which communicates with the hydraulic brakes of the vehicle, not shown. The higher the fluid pressure within cylinder 16, the higher the fluid pressure within the vehicle brakes, and the greater the braking action produced.

An opposite piston or pulsation piston 14 is affixed to the piston rod 16B spaced from the piston 16A wherein a chamber 15 is defined in the master cylinder bore between said master cylinder and the actuating means 13. The chamber 15 is defined at its left end by a seal bearing against a ring received in a groove formed in the bore.

A pressure relief or regulating valve is formed in the master cylinder housing and includes a check valve element 22 seating in a bore between the chamber 15 and an outlet opening. The pressure regulating valve components are mounted within a cap 23 threadably connected to the master cylinder housing and include a cylinder 18 in which a regulating piston 19 freely reciprocates, and the left end of the cylinder 18 communicates with the master cylinder 16 through a throttle orifice 17. The right end of the piston 19 engages a sleeve 20 against which the left end of the compression spring 21 bears. The right end of the compression spring 21 bears against the valve element 22. The cross-sectional area of the piston 19 is hereby smaller than that of the velve 22.

As the cylinder 18 communicates with the master cylinder 16 through the orifice 17, it will be appreciated that the pressure of the fluid within the cylinder 18 at the left end of the piston 19 will correspond to the pressure of the fluid within the master cylinder chamber 16, and if the pressure within cylinder 16 is great enough the piston 19 will bias the sleeve 20 toward the right to further compress spring 21 and increase the pressure required to unseat valve element 22 from its valve seat.

The valve 22 communicates with a reservoir valve 24 which is of a check valve type having a spring biasing the reservoir valve to a closed condition. The reservoir valve communicates with the chamber 15, and the fitting adjacent the reservoir valve communicates with a fluid reservoir, not shown.

An electromagnetic solenoid valve 25 is mounted within the master cylinder housing and includes a valve spool selectively establishing communication between the chamber 15 and the fluid reservoir, and in FIG. 2 is shown in the open position wherein the chamber 15 communicates with the fluid reservoir. Energization of the valve coil shifts the valve spool to the left closing the communication between chamber 15 and the fluid reservoir.

Damping of the pulsations is produced by an elastic diaphragm 29 communicating with the chamber 15. The diaphragm 29 defines a wall of pressure chamber 30, such that pulsation pressures exerted on the left face of the diaphragm 29 cause the diaphragm to deform into the pressure chamber 30 compressing the air entrapped therein.

The pulsations within the chamber 15 are formed by a pump piston 31 communicating with chamber 15. The pump 31 is slidably received within a bore defined in the master cylinder housing, and is oscillated by a crank arm driven by electric motor 28.

As will be appreciated from FIG. 2, the sensor 26 is connected in series with the vehicle brake light circuit such that engagement of the contact 9 with the edge of the recess 8 will complete a circuit energizing the coil of slow-release relay or drop delay relay 27 which connects the motor 28 to the vehicle battery and energizes the motor. The relay armature maintains the relay closed as long as the sensor provides a signal or a sequence of signals as determined by the engagement of contact 9 with an edge of recess 8. The solenoid valve 25 is connected in parallel with the motor 28 and is thus energized simultaneously with the electric motor.

In normal operation, the components will be oriented as shown in FIG. 2. When there is no danger of wheel slip so that the wheel deceleration and the linear deceleration of the vehicle have a predetermined ratio with respect to each other, the mass 6 with its recess 8 will not engage the contact 9 and the circuit of the relay 27 will be open. Braking of the vehicle occurs in the normal manner. The operator applies the brakes by depressing foot pedal 13 moving piston 16A to the left and increasing the fluid pressure within master cylinder 16. The fluid within chamber 15 exhausts into the reservoir around the spool of valve 25, and no pulsations within the vehicle braking system are produced. When the piston 16A returns to the right upon release by the operator, hydraulic fluid flows into chamber 15 through the inlet valve 24 and through the solenoid valve 25.

If, however, as a result of the brakes being applied too sharply inadmissible wheel slip occurs the mass 6 moves linearly and rotationally so that the contact 9 engages an edge of the recess 8 completing the circuit through the relay 27 and energizing the electric motor 28 and solenoid valve 25. The pump 31 begins to oscillate, and the spool of valve 25 is shifted to the left closing chamber 15 with respect to the fluid reservoir. The oscillation of pump 31 produces pulsating pressures within chamber 15 which reduce the pressure in the master cylinder 16 and are damped by the diaphragm 29. The pulsating pressure within chamber 15 acts upon piston 14 against the force being exerted upon piston rod 16B by the operator producing a pulsation of the master cylinder piston 16A, and a pulsation of the fluid pressure within cylinder 16 and within the wheel brakes.

The amplitude or force of the pulsation pressure within chamber 15 is dependent upon the fluid pressure created in cylinder 16 by the driver. Under relatively light braking conditions the pressure within cylinder 16, and cylinder 18, may not be sufficient to displace sleeve 20 to the right to produce compression of spring 21, and pressure relief valve 22 will open at that pressure determined by the spring 21 in its maximum extended condition. Thus, valve 22 determines the pressure within chamber 15 as valve 22 will open permitting the fluid pressure to escape through an outlet opening into the reservoir when the pressure exceeds that force necessary to displace valve 22 from its seat.

If more braking force is required the operator will exert more pressure on the foot pedal 13 producing a high fluid pressure within cylinder 16 and cylinder 18. Such high fluid forces will displace sleeve 20 to the right compressing spring 21, and under very high pressure conditions the right end of the sleeve 20 may directly engage the rear of the valve 22. Movement of the sleeve 20 increases the resistance of the valve 22 to unseat, and thus the pulsation pressures within chamber 15 will be high, as determined by the resistance of the valve 22 to unseat and permit fluid to flow to the reservoir under maximum pulsation peaks.

With the pressure stroke of the pump 31 the hydraulic fluid flows through the valve 22, and during the suction stroke of the pump 31 fluid flows through the inlet valve 24 into communication with the pump 31 and the chamber 15. The diaphragm 29 dampens and softens the pulsations, within limits, and assures an effective yet operable action.

The pulsation force will be imposed upon the brake system as long as the motor 28 is energized, and upon the brake pedal being released, or upon the sensor 26 no longer indicating inadmissible wheel slip, the relay 27 will be opened restoring the braking system to its normal operation.

As the force at which the valve 22 opens to relieve the pressure within chamber 15 varies in accord with the required braking pressure, as existing within cylinder 16, it will be appreciated that the amplitude of the pulsations imposed upon piston 14, and piston 16A, will be directly proportional to the force imposed upon the actuating foot pedal 13, and this correlation between pulsating pressures and braking pressures produces an effective and safe vehicle brake system.

Figure 3:
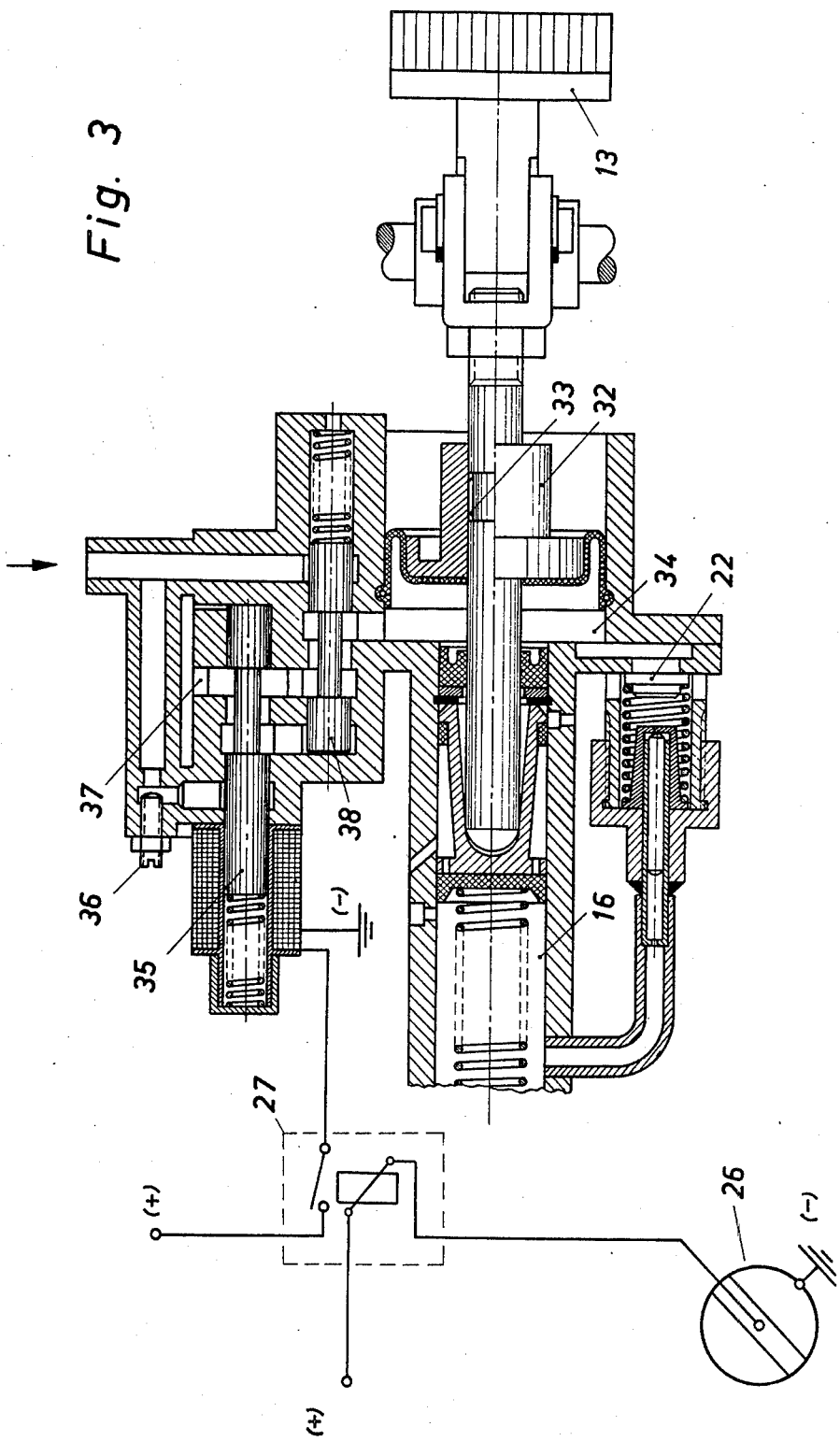
FIG. 3 is a combination sectional and schematic view of an embodiment of an anti-locking brake device in accord with the invention for pneumatic operation.

An embodiment of the invention is shown in FIG. 3 wherein a compressed air anti-locking braking device is illustrated. In FIG. 3 components similar to those previously described are represented by like reference numerals.

In the embodiment of FIG. 3 the master brake cylinder housing includes a master brake piston selectively positionable by the foot pedal 13. A piston 32 is mounted upon the master piston rod for limited axial displacement thereto by an elastic ring 33 and an elastic seal interposed between piston 32 and the master brake housing defines a pulsation chamber 34 for receiving the pulsating air pressure to pulsate the master cylinder piston.

A pressure regulating or relief valve 22 communicates with the chamber 34, and the valve 22 has an outlet or an exhaust opening, a cylinder, sleeve, spring and piston associated therewith identical in configuration and operation to elements 17 through 23 described with respect to the previous embodiment. It will be noted that the cylinder of the pressure relief valve communicates with the master cylinder chamber 16. Displacing of the valve 22 from its seat exhausts the air through an outlet opening to the atmosphere instead of into a reservoir.

The embodiment of FIG. 3 includes a compressed air inlet passage which selectively communicates with the chamber 34 through an automatic interrupter spring biased valve 38, which is normally biased to the left by its spring. The channel 37 is open to the atmosphere, and is normally in communication with chamber 34 with the valve components in their normal position as illustrated in FIG. 3.

The solenoid valve 35 is normally biased to the right, FIG. 3, and the spool thereof controls the flow of compressed air through an adjustable throttle valve 36 which controls the pulsation rate. Energization of the solenoid valve 35 is through the drop relay 27, whose coil is controlled by the brake light and sensor circuit 26 as previously described.

During normal braking conditions the hydraulic brake fluid within cylinder 16 is pressurized by the foot pedal 13, and the reciprocation of the master cylinder brake piston is unhindered by air within chamber 34 as such air exhausts to the atmosphere through channel 37 with the valve 38 in its left position, and the valve 35 in its normal right position.

If on applying the brakes the danger of wheel slip simultaneously occurs, sensor 26 closes the circuit so that the relay energizes valve 35 whereby it is drawn to the left. This movement of the valve 35 permits compressed air to flow through throttle 36 into communication with the left end of the valve spool 38. Such pressurization shifts the valve 38 to the right establishing direct communication between the compressed air supply and the chamber 34. Such pressurization of the chamber 34 produces a force on the master cylinder brake piston rod to the right opposing the force being applied by the operator, whereby the pressure in the master cylinder is reduced. The pressure buildup within chamber 34 will be dependent upon the pressure within cylinder 16, since a pressure within chamber 34 which exceeds the force necessary to unseat valve 22 will permit such excessive pressure to escape to the atmosphere. Thus, as in the previous embodiment, the greater the pressure within cylinder 16 the greater the pressure necessary to unseat valve 22, and thus the amplitude of the pulsation force within chamber 34 is directly proportional to the pressure within cylinder 16.

When the valve 38 is displaced to the right sufficiently the air pressure on the left end of the valve 38 can escape through channel 37 to the atmosphere. Then the spring of valve 38 returns the valve to the left to the position shown in FIG. 3. Such return movement of the valve 38 closes off the chamber 34 from direct communication with the compressed air supply and permits venting of the chamber 34 to the atmosphere through the valve 38 and channel 37. The pressure again builds up at the left of the valve 38 as determined by the rate of airflow through valve 36 shifting the valve to the right to produce another pulsation cycle.

Upon the circuit to relay 27 opening either due to the brake light circuit being opened, or the sensor circuit opening, the valve 35 returns to its right position and the braking apparatus will then be operated in a nonpulsating manner until valve 35 is again energized.

It will therefore be appreciated that the inventive concepts of the invention may be practiced with either electric motor produced pulsation, or compressed air produced pulsation, and it is within the scope of the invention to utilize other motive means for producing the pulsation pressures such as a vacuum.

It will therefore be appreciated that the invention produces a pulsating brake force wherein the amplitude or force of the pulsations is directly related to the braking pressure existing within the master cylinder and road wheel brakes, and the automatic operation and correlation of braking and pulsating pressures as determined by valve element 22 produces a braking system which is safe, responsive to the desired braking characteristics, and permits the operator to maintain control of the braking characteristics under all conditions.

Besides allowing the proposal shown and described to act on an anti-locking device on all the wheels of a vehicle there is also the possibility of providing individual wheels, groups of wheels or axles, for example, in multi-axle vehicles, with separate devices to protect them from locking.

I claim:

1. An antilocking brake system for a vehicle with wheels having a sensing means in connection with at least one of the brakable vehicle wheels for monitoring wheel rotary deceleration, said brake system comprising: wheel brake cylinders, a master cylinder communicating with the wheel brake cylinders including a master cylinder piston therein, actuating means connected to the master cylinder piston for the actuation thereof, a chamber interposed between said master cylinder and said actuating means including an opposite piston in communication with the actuating means for reducing the braking force in the master cylinder when pressure within said chamber acts upon the opposite piston, pulsating means in communication with said chamber for producing pressure pulsations within the chamber, a solenoid valve connected to said sensing means for actuating the pulsating means, and further comprising:

a pressure regulating valve in communication with said chamber, an outlet and the master cylinder including a cylinder in communication with the master cylinder, a slidable regulating piston reciprocating in the cylinder, a check valve between the chamber and the outlet in order to pass fluid from said chamber to said outlet of the regulating valve, and a spring means mounted between said check valve and the regulating piston.

2. An antilocking brake system for a vehicle with wheels having a sensing means in connection with at least one of the brakeable vehicle wheels for monitoring wheel rotary deceleration, said brake system comprising: wheel brake cylinders, a master cylinder communicating with the wheel brake cylinders including a master cylinder piston therein, actuating means connected to the master cylinder piston for the actuation thereof, a chamber interposed between said master cylinder and said actuating means including an opposite piston in communication with the actuating means for reducing the braking force in the master cylinder when pressure within said chamber acts upon the opposite piston, pulsating means in communication with said chamber for producing pressure pulsations within the chamber, a solenoid valve connected to said sensing means for actuating the pulsating means, and further comprising:

a pressure regulating valve in communication with said chamber, an outlet and the master cylinder including: a cylinder in communication with the master cylinder, a slidable piston valve element reciprocating in said cylinder, and a check valve connected with said piston valve element and arranged between said chamber and the outlet in order that fluid can pass out of the chamber.

3. The antilocking brake system as defined in claim 2, wherein said piston valve element of the pressure regulating valve has an effective cross-sectional area for the pressure, said area being smaller than the cross-sectional area of said check valve, and wherein a throttle orifice is arranged between said cylinder of the regulating valve and said master cylinder.

4. The antilocking brake system as defined in claim 1, wherein said pulsating means includes a pump piston within said chamber, an electric motor connected with said pump piston for producing pressure pulsations, a reservoir in communication with said brake system, and a check valve between the chamber and said reservoir so that fluid can pass from the reservoir into the chamber, and wherein said solenoid valve is mounted between said chamber and the reservoir normally establishing a communication in order, when active, to shut off this communication.

5. The antilocking brake system as defined in claim 2, wherein said pulsating means includes a compressed-air supply and an automatic interrupter which, when active, alternately connects said chamber with said compressed-air supply and an exhaust passage to the free atmosphere.

6. The antilocking brake system as defined in claim 1, wherein said sensing means comprises a sensor, a drop delay relay means connected in series with said sensor and the vehicle brake light circuit for actuating said solenoid valve as long as said sensor produces signals.

7. In an antilocking system for wheeled vehicles having a braking system for the wheels including a master cylinder, a master cylinder piston therein, actuating means for the actuation thereof, a piston rod between the master cylinder piston and said actuating means in order to transmit the braking force to the piston, a chamber arranged between said master cylinder and said actuating means including an opposite piston in communication with the actuating means for reducing the braking force in the master cylinder when pressure within said chamber acts upon the opposite piston, pulsating means in communication with said chamber for producing pressure pulsations within the chamber, a pressure regulating valve in connection with said chamber, an outlet opening and said master cylinder including: a cylinder communicating with the master cylinder, a reciprocating piston within the cylinder, a check valve between said chamber and the outlet opening connected to pass fluid in a direction from said chamber to said outlet opening of the regulating valve, and a compression spring mounted between said check valve and the regulating piston.

8. An antilocking brake system for a vehicle having at least one brakeable wheel braked by pressurized fluid, said system comprising a master cylinder communicating with the brakeable wheel including a master cylinder piston, actuating means connected to said piston for the actuation thereof, sensing means responsive to linear and rotary deceleration for controlling the predetermined ratio of wheel angular deceleration to the vehicle deceleration and producing a signal during the duration of which the rotary deceleration is in excess of the predetermined relationship to the vehicle deceleration, said sensing means including a rotatable shaft drivingly connected to said brakeable wheel and parallel to the vehicle axis, a mass resiliently mounted upon said shaft rotatably thereon in response to angular deceleration of said wheel and, independently of this, axially displaceable thereon in response to the deceleration of the vehicle, an electric contact means fixed to the shaft and interposed between said shaft and said mass sensing relative displacement between said mass and said shaft to monitor movement of said mass relative to said shaft and provide an electrical signal when the ratio of angular deceleration to linear deceleration exceeds a predetermined quantity, and further comprising a chamber between said master cylinder and the actuating means including an opposite piston therein connected to said master cylinder piston in order, when active, to reduce the brake pressure in the master cylinder, pulsating means in communication with said chamber for producing pressure pulsations in the chamber, said sensing means being connected to said pulsating means for actuating said pulsating means, and a pressure regulating valve communicating with the pulsating means and said master cylinder controlling the amplitudes of the pressure pulses of said pulsating means in proportion to the pressure within said master cylinder as produced by said actuating means.

9. In an antilocking brake system as defined in claim 8, wherein said pressure regulating valve includes a normally seated valve element having a first surface exposed to the fluid pressure of said pulsating means, and a second surface opposed to said first surface exposed to the pressure in said master cylinder, biasing means engaging said second surface biasing said valve element toward its seated condition, and means establishing communication between said biasing means and said master cylinder wherein the force of said biasing means is proportional to the pressure of the fluid within said master cylinder.

10. In an antilocking brake system as defined in claim 9, wherein said biasing means includes a cylinder communicating with said master cylinder, a piston within said biasing means cylinder, and a compression spring interposed between said biasing means piston and said valve element.

* * * * *